United States Patent
Kajihara et al.

(10) Patent No.: US 9,067,519 B2
(45) Date of Patent: Jun. 30, 2015

(54) VEHICLE SEAT

(75) Inventors: Takehiro Kajihara, Aichi-ken (JP);
Kunio Nishiyama, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 364 days.

(21) Appl. No.: 13/591,589

(22) Filed: Aug. 22, 2012

(65) Prior Publication Data

US 2013/0049433 A1 Feb. 28, 2013

(30) Foreign Application Priority Data

Aug. 23, 2011 (JP) .................................. 2011-181092

(51) Int. Cl.
*A47C 31/00* (2006.01)
*B60N 2/58* (2006.01)

(52) U.S. Cl.
CPC ............. *B60N 2/5825* (2013.01); *B60N 2/5833* (2013.01); *Y10T 24/344* (2015.01)

(58) Field of Classification Search
CPC .. B60N 2/5825; B60N 2/5816; B60N 2/5833; Y10T 24/344
USPC ........ 297/452.59, 452.6, 463.1, 218.1, 218.2, 297/218.3, 218.4, 218.5, 228.13; 24/336
See application file for complete search history.

(56) References Cited

U.S. PATENT DOCUMENTS

| | | | | |
|---|---|---|---|---|
| 3,630,572 A * | 12/1971 | Homier | ...................... | 297/452.6 |
| 5,653,503 A * | 8/1997 | Taggart | ...................... | 297/218.5 |
| 5,879,051 A * | 3/1999 | Cozzani | ...................... | 297/218.3 |
| 7,287,305 B2 * | 10/2007 | Bednarski | ........................ | 24/297 |
| 7,568,761 B2 * | 8/2009 | Mashimo | .................... | 297/218.4 |
| 7,891,735 B2 * | 2/2011 | Oku | ........................... | 297/218.3 |
| 7,901,002 B2 * | 3/2011 | Mashimo | .................... | 297/218.3 |
| 8,197,010 B2 * | 6/2012 | Galbreath et al. | .......... | 297/452.6 |
| 8,528,984 B2 * | 9/2013 | Galbreath et al. | .......... | 297/452.6 |
| 8,690,257 B2 * | 4/2014 | Stiller et al. | ................ | 297/452.6 |
| 8,814,268 B2 * | 8/2014 | Mineta et al. | ............ | 297/228.13 |
| 2012/0319448 A1 * | 12/2012 | Mineta et al. | .............. | 297/452.1 |

FOREIGN PATENT DOCUMENTS

| | | |
|---|---|---|
| JP | 06-038794 | 5/1994 |
| JP | 2001-169868 | 6/2001 |
| JP | 2004-016710 | 1/2004 |
| JP | 2009-179090 | 8/2009 |
| JP | 2010-188912 | 9/2010 |

OTHER PUBLICATIONS

Japanese Office action for JP2011-181092 dated Dec. 16, 2014, along with an English-language translation thereof.

* cited by examiner

*Primary Examiner* — Chi Q Nguyen
(74) *Attorney, Agent, or Firm* — Greenblum & Bernstein, P.L.C.

(57) ABSTRACT

An attaching member includes a cover attaching portion to which a portion of a cover directly or indirectly attaches, a board attaching portion to which one end of a board member attaches, and an engaging portion that engages with a frame member. The portion of the cover is attached to the cover attaching portion, the board member is attached to the board attaching portion, mutual positions of the portion of the cover and the board member are fixed, and the engaging portion is engaged with the frame member.

9 Claims, 4 Drawing Sheets

VEHICLE SEAT

INCORPORATION BY REFERENCE

The disclosure of Japanese Patent Application No. 2011-181092 filed on Aug. 23, 2011 including the specification, drawings and abstract is incorporated herein by reference in its entirety.

BACKGROUND OF THE INVENTION

1. Field of the Invention

The invention relates to a vehicle seat provided with a cover, a frame member, an attaching member (i.e., a member that attaches a portion of the cover to the frame member), and a board member.

2. Description of Related Art

Japanese Patent Application Publication No. 2010-188912 (JP 2010-188912 A), for example, describes one such known vehicle seat. This vehicle seat includes a seat cushion, a seat back, and a board member. The seat back includes a frame member that forms a seat frame, a cushion that forms an outer shape of the seat, and a cover that covers the cushion. Also, the board member is a flat plate made of resin that is attached to a rear surface of the seat back. A first engaging portion and a second engaging portion are formed on a back surface of the board member. The first engaging portion has a generally sideways L-shape in a sectional view, and is able to protrude on an upper portion of the board member. Also, the second engaging portion has a generally sideways I-shape in a sectional view, and is able to protrude on a lower portion of the board member.

Also, the seat back of the related art has a first wire and a first clip for attaching the board member. The first wire has a rod shape that extends in a seat width direction, and is attached connected in at least two locations to the frame member. Also, the first clip is arranged inside the seat, and is able to hold the second engaging portion. In the related art, the board member is arranged on the rear surface of the seat back, and the cushion is covered by the cover. At this time, the first engaging portion is engaged with the wire to hold the upper portion of the board member to the frame member. Next, the second engaging portion is held by the first clip to hold the lower portion of the board member to the frame member.

In the seat structure described above, the cover is formed by a plurality of cover pieces (i.e., a first cover piece that covers the upper portion of the seat, and a second cover piece that covers the rear surface of the seat). Then, end portions of the cover pieces are overlapped (forming a portion of the cover) and tucked into the seat and held there. In Japanese Patent Application Publication No. 2009-179090 (JP 2009-179090 A), for example, a second wire for attaching the portion of the cover is provided. The second wire is arranged higher on the seat than the first wire, when the seat is in an upright position. Next, the end portion of the first cover piece and the end portion of the second cover piece are overlapped and sewn to a strip of fabric (forming a suture line). The fabric is then tucked into the seat directly above the board member and held to the second wire by a hog ring or the like. In this way, the end portions of the cover pieces (i.e., the portions of the cover) are able to be retained tucked into the seat at a position above the board member.

In the related art, a plurality of members (i.e., the board member and the portion of the cover) is attached to the seat back independently, which tends to increase the number of parts of the seat. Also in the related art, the appearance of the seat may diminish somewhat due to waviness or looseness (i.e., slack) or the like appearing in the cover. For example, the cover may be loose in some parts due to the fabric (i.e., the portion of the cover) being pushed up by the board member. Also, the suture line of the cover may be wavy in the vertical direction due to tension in the cover that is created when an occupant sits on the seat, for example.

SUMMARY OF THE INVENTION

In view of the foregoing problems, the invention provides a vehicle seat in which an increase in the number of parts of the seat is suppressed to the greatest extend possible, and a board member and a portion of a cover are attached to the frame member in an aesthetically pleasing manner.

One aspect of the invention relates to a vehicle seat that includes a seat cushion and a seat back. The seat back includes a frame member that forms a seat frame, a cushion that forms an outer shape of the seat, a cover that covers the cushion, and a board member that is arranged on a rear surface of the seat back. The cushion described above is arranged on the frame member and covered by the cover, and a portion of the cover is attached to the frame member via an attaching member. Also, a board member is arranged on a rear surface of the seat back, and this board member is attached to the frame member. With this kind of seat structure, it is desirable to attach the board member and the portion of the cover to the frame member in an aesthetically pleasing manner while suppressing an increase in the number of parts of the seat to the greatest extent possible.

Therefore, in this aspect of the invention, the attaching member described above includes a cover attaching portion to which the portion of the cover directly or indirectly attaches, a board attaching portion to which one end of the board member attaches, and an engaging portion that engages with the frame member. The portion of the cover is attached to the cover attaching portion, the board member is attached to the board attaching portion, mutual positions of the portion of the cover and the board member are fixed, and the engaging portion is engaged with the frame member. With this aspect of the invention, both the portion of the cover and the one end of the board member are collectively attached to the frame member by a single attaching member, so the number of parts of the seat are able to be reduced. Also with this aspect of the invention, the relative positional relationships of the portion of the cover and the board member with respect to the frame member are able to be maintained by the attaching member, so the aesthetics of the seat are able to be well maintained.

In the vehicle seat described above, the board member and the portion of the cover are able to be attached to the frame member in an aesthetically pleasing manner while suppressing an increase in the number of parts of the seat to the greatest extent possible.

BRIEF DESCRIPTION OF THE DRAWINGS

Features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
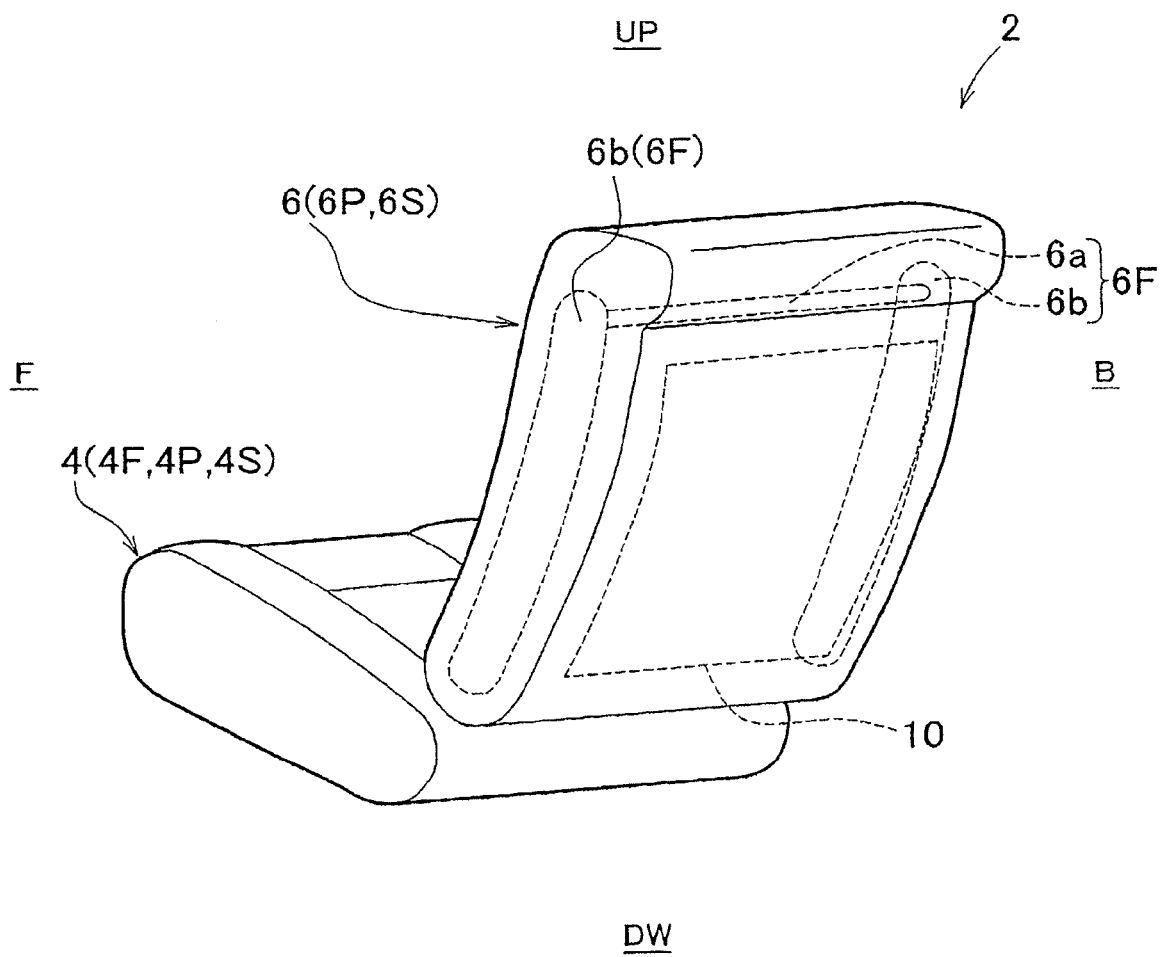
FIG. 1 is a perspective view of a vehicle seat.

Hereinafter, example embodiments of the invention will be described with reference to FIGS. 1 to 6. In the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat, as appropriate. The vehicle seat 2 in FIG. 1 includes a seat cushion 4 and a seat back 6. Each of these seat structure members includes a frame member (4F and 6F) that forms a seat frame, a cushion (4P and 6P) that forms an outer shape of the seat, and a cover (4S and 6S) that covers the cushion.

The seat back 6 has a base structure (6F, 6P, and 6S), a board member 10, and an attaching member 20 (these members will be described in detail later; see FIG. 2). In a first example embodiment, the cushion 6P is arranged on the frame member 6F and then covered by the cover 6S. A portion of the cover GS is tucked in and attached to the frame member 6F via the attaching member 20. Also, the board member 10 is arranged on a rear surface of the seat back 6 and is attached to the frame member 6F. In this type of seat structure, it is desirable to attach the board member 10 and the portion of the cover 6S to the frame member 6F in an aesthetically pleasing manner while suppressing an increase in the number of parts of the seat. Therefore, in the first example embodiment, the board member 10 and the portion of the cover 6S are attached to the frame member 6F in an aesthetically pleasing manner while suppressing an increase in the number of parts of the seat by the structure described below.

Figure 2:
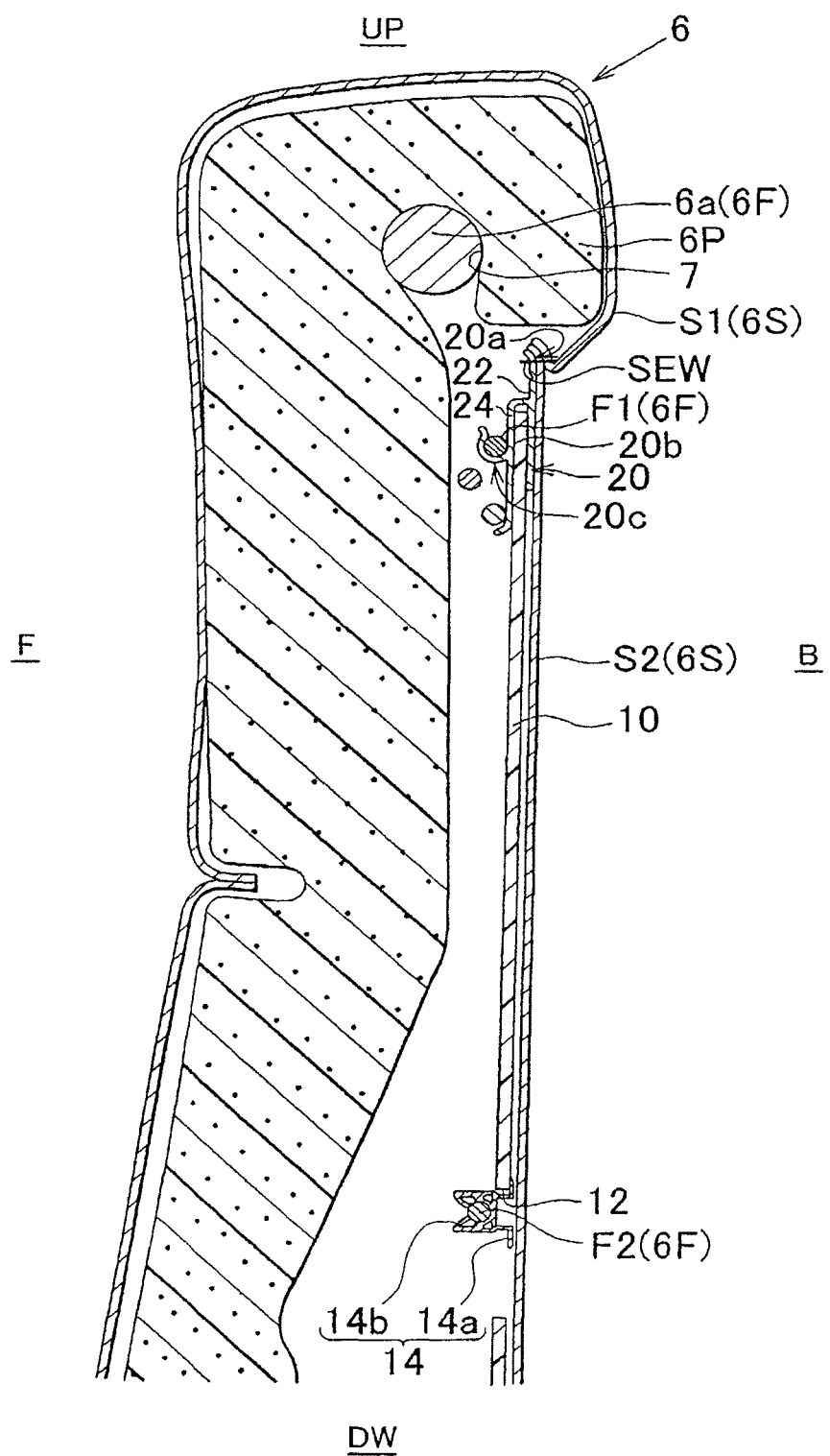
FIG. 2 is a longitudinal sectional view of a portion of a seat back.

The frame member 6F (an arch-shaped frame body) includes an upper frame 6a, a pair of side frames 6b, and a plurality of wires (i.e., a first wire F1 and a second wire F2) (see FIGS. 1 and 2). The upper frame 6a is a rod-shaped member that forms an upper portion of the seat. Also, the pair of side frames 6b are flat plate members that form side portions of the seat. The plurality of wires (i.e., first wire F1 and second wire F2) is both rod-shaped members that extend between the pair of side frames 6b and are attached thereto. In the first example embodiment, the first wire F1 is arranged in the seat width direction (substantially horizontal) and attached in an upper position on the seat when the seat back 6 is in the upright position. Also, the second wire F2 is arranged in the seat width direction (substantially horizontal) and attached in a lower position on the seat when the seat back 6 is in the upright position.

The cushion 6P is a generally rectangular member that forms the outer shape of the seat, and has an engaging portion 7 (see FIG. 2). The material of the cushion 6P is not particularly limited, and may be resin having elastic force such as polyurethane foam, for example. The engaging portion 7 is a recessed portion formed on the back surface of the upper portion of the cushion 6P, and hooks onto the frame member 6F (i.e., the upper frame 6a).

Also, the cover 6S is a bag-shaped member that covers the cushion 6P, and includes a plurality of cover pieces (i.e., a first cover piece S1 and a second cover piece S2) (see FIG. 2). The material of the cover 6S is not particularly limited, but may be fabric such as woven, knit, or non-woven fabric, or leather such as natural leather or synthetic leather, for example. Also, the first cover piece S1 is a cover piece that covers the upper portion of the cushion 6P, and the second cover piece S2 is a cover piece that covers the rear surface of the cushion 6P. In this first example embodiment, the rear portion of the first cover piece S1 and the upper portion of the second cover piece S2 overlap to form a portion of the cover, and this portion of the cover is then attached to the attaching member 20 that will be described later.

The board member 10 is a flat plate that is made of resin and has a generally rectangular shape when viewed from the front. The board member 10 has an insertion hole 12 and a clip member 14 (see FIGS. 1 and 2). The insertion hole 12 is a through-hole for inserting the clip member 14, and may be formed in a lower portion of the board member 10. Moreover, the position of the insertion hole 12 is a position opposing the second wire F2. Also, the clip member 14 has an engaging portion 14a (having a generally sideways L-shape in a sectional view) that engages with the insertion hole 12 (i.e., the inner edge thereof), and a holding portion 14b (having a generally sideways U-shape in a sectional view) that holds the second wire F2. In this first example embodiment, the engaging portion 14a is inserted through the insertion hole 12, and the second wire F2 is held by the holding portion 14b. In this way, the lower portion of the board member 10 is able to be attached to the frame member 6F (i.e., the second wire F2) via the clip member 14.

The attaching member 20 is a flat plate that extends in the seat width direction, and has a plurality of portions (i.e., a cover attaching portion 20a, a board attaching portion 20b, and an engaging portion 20c) that will be described later (see FIGS. 2 to 4). The attaching member 20 that is made of resin has a thickness dimension that enables a sewing needle, not shown, to be able to be inserted into it, such that the plurality of cover pieces S1 and S2 is able to be attached to the attaching member 20 by sewing. The attaching member 20 in this first example embodiment has a generally inverted Y-shape in a sectional view, and has a base portion 22 and a connecting portion 24 that is connected to the base portion 22. The base portion 22 (a flat plate portion) is provided in a position opposite the back surface of the seat back 6. Also, the connecting portion 24 is generally L-shaped in a sectional view, and branches off from the base portion 22 midway along the base portion 22. The connecting portion 24 in this first example embodiment protrudes at a right angle (toward the seat back 6 side) from a point midway along the base portion 22 and then curves downward with respect to the seat. In this first example embodiment, a notch N and holes H are provided appropriately in the attaching member 20 to prevent interference with other seat structures.

Figure 3:
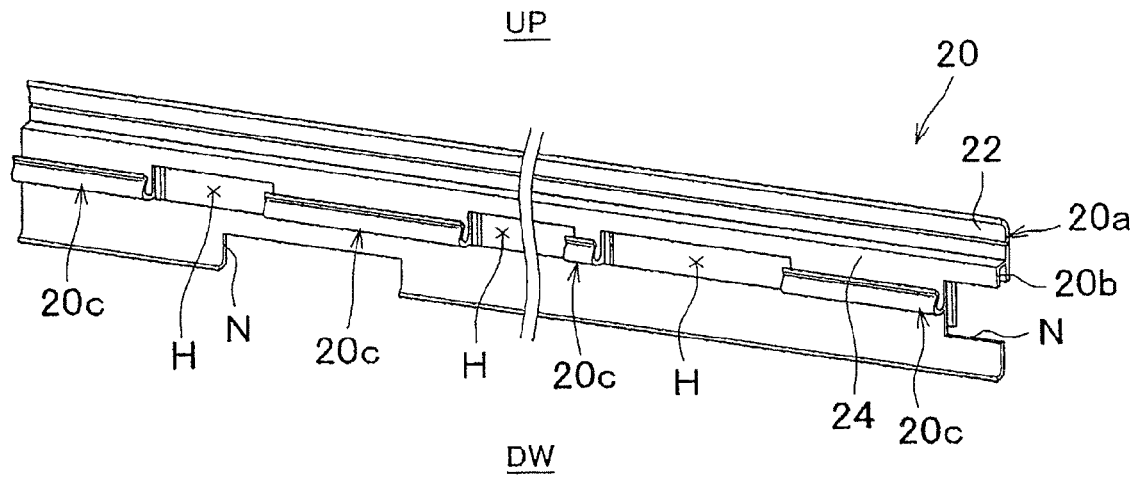
FIG. 3 is a perspective view of an attaching member according to a first example embodiment of the invention.
Figure 4:
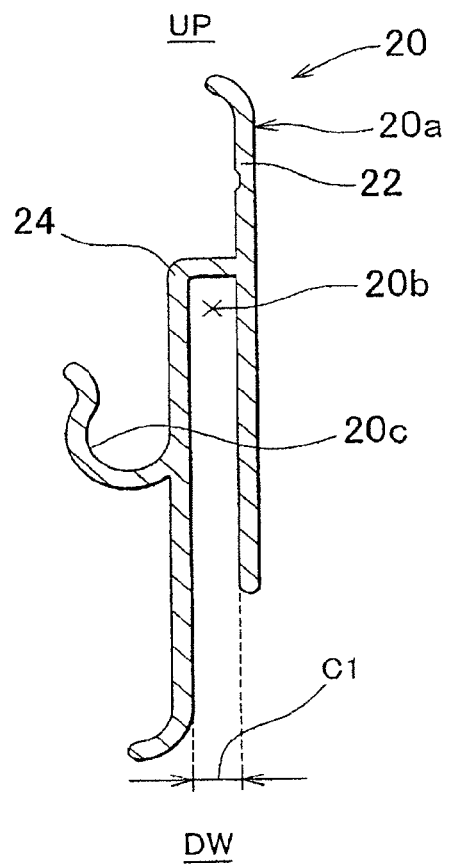
FIG. 4 is a longitudinal sectional view of the attaching member.
Figure 5:
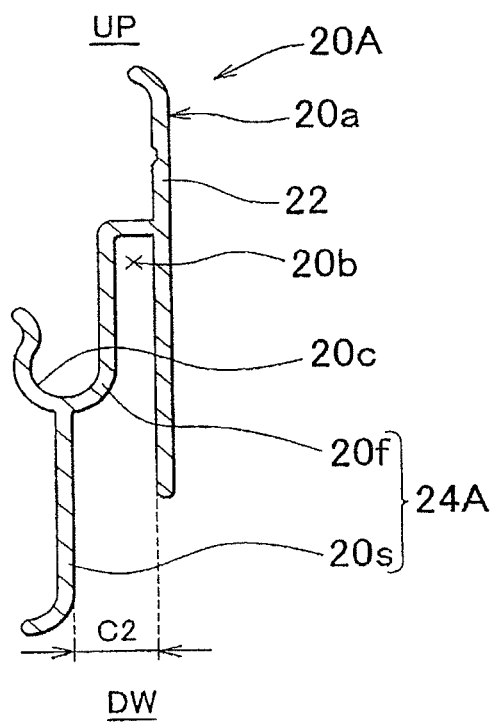
FIG. 5 is a longitudinal sectional view of an attaching member according to a second example embodiment of the invention.

The cover attaching portion 20a is a portion to which a portion of the cover 6S (i.e., a rear end of the first cover piece S1 and an upper end of the second cover piece S2) directly or indirectly attaches (see FIGS. 2 to 4). The cover attaching portion 20a in the first example embodiment is formed on an upper portion (above the connecting portion 24) of the base portion 22, and the first cover piece S1 and the second cover piece S2 are able to be attached to the cover attaching portion 20a by sewing. Also, the board attaching portion 20b is a portion for attaching the board member 10. The board attaching portion 20b in this first example embodiment is a space provided between a lower portion of the base portion 22 and the connecting portion 24, into which one end of the board member 10 can be inserted. In this first example embodiment, a clearance C1 that enables the board member 10 to be inserted into the board attaching portion 20b (i.e., between the base portion 22 and the connecting portion 24) can be ensured by adjusting the separation dimension of the connecting portion 24 with respect to the base portion 22.

The engaging portion 20c is a portion that engages with the frame member 6F (i.e., the first wire F1) (see FIGS. 2 to 4). The engaging portion 20c in this first example embodiment is a portion that protrudes toward the seat back 6 side from midway along the connecting portion 24. The engaging portion 20c has a generally inclined C-shape in a sectional view, and is able to receive the first wire F1 from an opening on an upper side. Also in this first example embodiment, movement of the attaching member 20 upward is restricted by the first wire F1 being fit into and engaged with the engaging portion 20c.

The attaching member may employ any of a variety of structures other than the structure illustrated in the first example embodiment. For example, an attaching member 30 according to a second example embodiment of the invention has a base portion 22 (a flat plate portion) and a connecting portion 24A (see FIG. 5). Also, the connecting portion 24A is crank-shaped (in a sectional view), and has a first portion 24f and a second portion 24s. The first portion 24f is a flat plate portion that is arranged parallel to the base portion 22. Also, the second portion 24s is a flat plate portion that extends downward from midway along the engaging portion 20c, and is arranged farther toward the seat back 6 side than the first portion 24f. In this second example embodiment, a clearance C2 between the second portion 24s and the base portion 22 is larger than the clearance C1 (i.e., the thickness dimension of the board attaching portion 20b) between the first portion 24f and the base portion 22. Therefore, the board member 10 is able to be smoothly led into the board attaching portion 20b while passing between the second portion 24s and the base portion 22 (i.e., through a portion with a large clearance).

Figure 6:
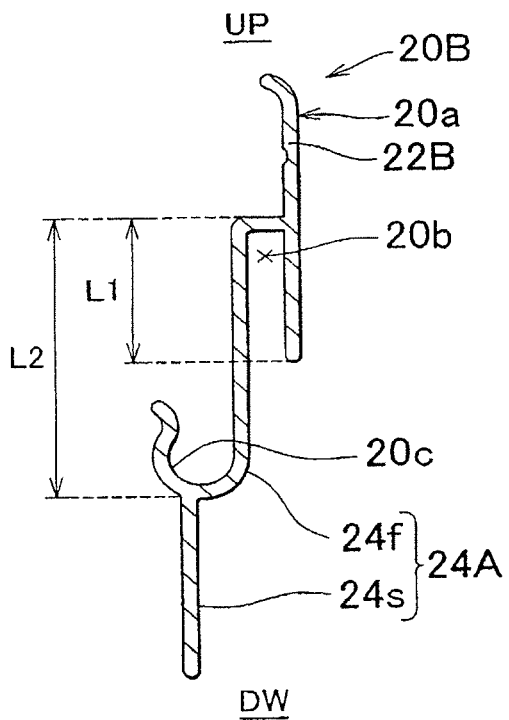
FIG. 6 is a longitudinal sectional view of an attaching member according to a third example embodiment of the invention.

Also, an attaching member 40 according to a third example embodiment of the invention includes a base portion 32 and a connecting portion 24A (i.e., a first portion 24f and a second portion 24s) (see FIG. 6). Also, the base portion 32 is a fairly short flat plate portion that extends to the middle of the first portion 24f. The base portion 32 according to the third example embodiment is such that a length dimension L1 of a portion of the base portion 32 that extends downward from the portion where the connecting portion 24A branches off is shorter than a length dimension L2 of the first portion 24f. Therefore, the connecting portion 24A is exposed midway, from the back side of the attaching member 40, so it is possible to see the board member 10 while smoothly guiding it into the board attaching portion 20b.

Referring to FIG. 2, the cushion 6P is arranged on the frame member 6F by engaging the engaging portion 7 with the upper frame 6a. Next, the cushion 6P is covered by the cover 6S, and a portion of the cover 6S is attached to the frame member 6F via the attaching member 20. At this time, in the first example embodiment, the end portion (i.e., the lower end) of the first cover piece S1 is arranged on the rear side of the seat while the upper portion of the cushion 6P is covered by the first cover piece S1. Next, the end portion (i.e., the upper end) of the second cover piece S2 is overlapped with the end portion (i.e., the lower end) of the first cover piece S1, while the rear surface of the cushion 6P is covered by the second cover piece S2. Then the end portions of both cover pieces that are overlapped with each other (thus forming a portion of the cover 6S) are then sewn to (i.e., attached by sewing) the cover attaching portion 20a (suture line SEW). The suture line SEW is arranged on the upper side of the seat (above the board member 10) and extends in the seat width direction.

Next, one end portion (the upper end) of the board member 10 is inserted into the board attaching portion 20b, and the other end side (the lower end side) of the board member 10 is attached to the second wire F2 via the clip member 14. Both the one end of the board member 10 and the portion of the cover 6S are able to be attached to the frame member 6F by engaging the engaging portion 20c with the first wire F1. At this time, in this first example embodiment, movement of the attaching member 20 upward is restricted by the first wire F1 being fit into the engaging portion 20c. The positional relationships of the board member 10 and the portion of the cover 6S with respect to the frame member 4F are maintained by the engagement of the attaching member 20 and the frame member 6F. That is, the mutual positions of the frame member 4F and the portion of the cover 6S are fixed. Also, the mutual positions of the frame member 4F and the board member 10 are fixed. In other words, the mutual positions of the portion of the cover 6S and the board member 10 are fixed.

As described above, in the first example embodiment, both the portion of the cover 6S and the one end of the board member 10 are able to be attached to the frame member 6F by the attaching member 20. Therefore, according to the first example embodiment, a special member for attaching the one end of the board member 10 can be omitted, which enables the manufacturing cost of the seat to be reduced. Also in this example embodiment, the relative positional relationships of the portion of the cover 6S and the board member 10 with respect to the frame member 6F can be maintained by the attaching member 20. Also, slack in the cover 6S (due to the board member 10 being pushed up) is able to be minimized by upward movement of the board member 10 being restricted. Further, waviness in the suture line SEW due to tension in the cover 6S or the like can be prevented or reduced by stably attaching the portion of the cover 6S to the cover attaching portion 20a. Therefore, with the first example embodiment, the board member 10 and the portion of the cover 6S are able to be attached in an aesthetically pleasing manner to the frame member 6F while suppressing as much as possible an increase in the number of parts of the seat.

The vehicle seats according to these example embodiments are not limited to the example embodiments described above. That is, various other example embodiments are also possible. 1) In the example embodiments, the portion of the cover 6S is directly attached to the cover attaching portion 20a. Alternatively, the end portion of the first cover piece and the end portion of the second cover piece may be overlapped and then attached to a strip of fabric. Then an end portion of the fabric may be attached to the cover attaching portion (i.e., the portion of the cover may be indirectly attached to the cover attaching portion).

2) Also in these example embodiments, the cover 6S has the first cover piece S1 and the second cover piece S2, but the structure of the cover 6S is not limited to this. For example, the second cover piece S2 may also be omitted (i.e., the structure may be such that the board member 10 is exposed). 3) Also in these example embodiments, the structure of the attaching member 20 is illustrated as an example, but the structure of the attaching member 20 is not limited to the structure of the attaching member 20. For example, the engaging portion 20c may have a generally sideways U-shape in a sectional view, and be able to hold the first wire F1. 4) Also in these example embodiments, the upper end of the board member 10 is attached to the attaching member 20, but a side end or a lower end of the board member 10 may also be attached to the attaching member 20 depending on the seat structure. 5) Also in this example embodiment, the seat back 6 is connected to the seat cushion 4 in a manner that enables it to be reclined and raised with respect to the seat cushion 4. Alternatively, the seat back may also be connected to a vehicle cabin structure such as the cabin floor or the like in a manner that enables it to be reclined and raised with respect to the vehicle cabin structure.

What is claimed is:

1. A vehicle seat comprising:
a seat cushion;
a seat back that includes a frame member that forms a seat frame, a cushion that is arranged on the frame member and forms an outer shape of the seat, a cover that covers the cushion, and a board member that is arranged on a rear surface of the seat back; and
an attaching member that attaches a portion of the cover to the frame member, and includes a base portion that extends downward along the rear surface of the seat back, a connecting portion that branches off from the base portion midway along the base portion and extends downward in a direction parallel to the extending direction of the base portion, a cover attaching portion that is provided on an upper portion of the base portion to which the portion of the cover attaches, a board attaching portion provided between a lower portion of the base portion and the connecting portion to which one end of the board member attaches, and an engaging portion that engages with the frame member, the board member connecting to the frame member via the attaching member,
wherein mutual positions of the portion of the cover and the board member are fixed by the portion of the cover being attached to the cover attaching portion and the board member being attached to the board attaching portion.

2. The vehicle seat according to claim 1, wherein
the connecting portion is generally L-shaped in a sectional view.

3. The vehicle seat according to claim 2, wherein
the cover attaching portion is provided on an upper portion of the base portion,
the board attaching portion is a space provided between the base portion and the connecting portion, and
one end of the board member is attached by being inserted into the space.

4. The vehicle seat according to claim 3, wherein
the engaging portion is provided on the connecting portion, has a generally inclined C-shape in a sectional view, and
the frame member is engaged by fitting into the engaging portion.

5. The vehicle seat according to claim 4, wherein
the cover includes a first cover piece that covers an upper portion of the cushion, and a second cover piece that covers a rear surface of the cushion,
a rear portion of the first cover piece and an upper portion of the second cover piece are overlapped to form the portion of the cover, and
the portion of the cover is sewn to the cover attaching portion.

6. The vehicle seat according to claim 3, wherein
a through-hole is defined in a lower portion of the board member, and
the frame member is attached to the other end of the board member by a clip member being inserted into the through-hole.

7. The vehicle seat according to claim 1, wherein
a portion of the connecting portion extends downward below the engaging portion.

8. The vehicle seat according to claim 7, wherein
the portion of the connecting portion extending downward below the engaging portion is arranged closer to a front side of the vehicle seat than an upper portion of the connecting portion provided above the engaging portion.

9. The vehicle seat according to claim 1, wherein
the connecting portion extends downward from midway along a lower portion of the engaging portion.

* * * * *